US012495313B2

(12) United States Patent
Zhou et al.

(10) Patent No.: US 12,495,313 B2
(45) Date of Patent: Dec. 9, 2025

(54) REMOTE RECONFIGURATION SYSTEM FOR INTERNET OF THINGS (IoT) INTELLIGENT SENSING TERMINAL

(71) Applicants: Shanghai Jiao Tong University, Shanghai (CN); Yunnan Power Grid Co., Ltd., Kunming (CN)

(72) Inventors: Lidan Zhou, Shanghai (CN); Jing Li, Shanghai (CN); Xianping Zhao, Kunming (CN); Gang Yao, Shanghai (CN); Dong Liu, Shanghai (CN); Jian Li, Chongqing (CN); Tiejun Cao, Chongqing (CN); Min Cao, Kunming (CN); Fei Chen, Shanghai (CN); Siyang Liu, Kunming (CN); Yongjie Nie, Kunming (CN)

(73) Assignees: Shanghai Jiao Tong University, Shanghai (CN); Yunnan Power Grid Co., Ltd., Kunming (CN)

( * ) Notice: Subject to any disclaimer, the term of this patent is extended or adjusted under 35 U.S.C. 154(b) by 517 days.

(21) Appl. No.: 17/859,951

(22) Filed: Jul. 7, 2022

(65) Prior Publication Data
US 2023/0140769 A1 May 4, 2023

(30) Foreign Application Priority Data
Nov. 3, 2021 (CN) .......................... 202111293852.0

(51) Int. Cl.
H04W 24/02 (2009.01)
H04L 67/12 (2022.01)
H04W 88/10 (2009.01)

(52) U.S. Cl.
CPC ............. *H04W 24/02* (2013.01); *H04L 67/12* (2013.01); *H04W 88/10* (2013.01)

(58) Field of Classification Search
CPC . G06F 30/347; H03K 19/17728; H04L 67/12; H04L 67/125; H04W 24/02; H04W 88/10
(Continued)

(56) References Cited

U.S. PATENT DOCUMENTS

2016/0119284 A1* 4/2016 Kim ...................... H04W 12/35
726/12
2016/0323143 A1* 11/2016 Kim ........................ H04L 67/12
(Continued)

FOREIGN PATENT DOCUMENTS

| CN | 104061931 A | * | 9/2014 | .......... G01C 21/165 |
| CN | 204334830 U | * | 5/2015 | |
| CN | 107589769 A | * | 1/2018 | |

*Primary Examiner* — Harun Chowdhury
(74) *Attorney, Agent, or Firm* — Stein IP, LLC

(57) ABSTRACT

A remote reconfiguration system for an Internet of Things (IoT) intelligent sensing terminal includes: a controlled terminal with a field programmable gate array (FPGA); and a remote control unit connected to the controlled terminal and a control device; where the remote control unit is configured to receive control information sent by the control device, process the control information and send the processed control information to the FPGA, such that the FPGA performs remote local autonomous reconfiguration based on the preprocessed control information. The system resolves problems that a traditional IoT terminal cannot realize remote control and cannot follow functional requirements to perform local autonomous reconfiguration, and has better versatility and expandability.

10 Claims, 3 Drawing Sheets

(58) Field of Classification Search
USPC .............................. 370/252, 254; 326/38, 39
See application file for complete search history.

(56) References Cited

U.S. PATENT DOCUMENTS

| | | | |
|---|---|---|---|
| 2018/0191848 A1* | 7/2018 | Bhattacharya | H04W 4/029 |
| 2021/0119632 A1* | 4/2021 | Zhu | H03K 19/17728 |
| 2022/0027543 A1* | 1/2022 | Zhu | H03K 19/17728 |

* cited by examiner

REMOTE RECONFIGURATION SYSTEM FOR INTERNET OF THINGS (IoT) INTELLIGENT SENSING TERMINAL

CROSS REFERENCE TO RELATED APPLICATION

This patent application claims the benefit and priority of Chinese Patent Application No. 202111293852.0 filed on Nov. 3, 2021, in the China National Intellectual Property Administration, the disclosure of which is incorporated by reference herein in its entirety as part of the present application.

TECHNICAL FIELD

The present disclosure relates to the field of remote control and reconfiguration technologies, and in particular, to a remote reconfiguration system for an Internet of Things (IoT) intelligent sensing terminal.

BACKGROUND ART

Nowadays, there is a large quantity of IoT terminal devices which are usually deployed in harsh conditions without being monitored and operated, and the IoT terminal device cannot be operated remotely. Furthermore, the existing intelligent sensing terminal has a single function which does not have characteristics of increase or decrease and replaceability, and cannot adapt to complicated and changeable application scenarios and objects. If each service object is provided with a set of computing platform, cost, complexity, uncertainty of a system may be increased greatly, and thus cannot meet system design requirements for application clients of the IoT.

SUMMARY

An objective of the present disclosure is to provide a remote reconfiguration system for an IoT intelligent sensing terminal, so as to control local autonomous reconfiguration remotely.

In order to achieve the foregoing and/or other objectives, the present disclosure provides a remote reconfiguration system for an IoT intelligent sensing terminal, where the system includes:
a controlled terminal with a field programmable gate array (FPGA); and
a remote control unit connected to the controlled terminal and a control device,
wherein the remote control unit is configured to receive control information sent by the control device, process the control information and send the processed control information to the FPGA, such that the FPGA performs remote local autonomous reconfiguration based on the preprocessed control information.
Optionally, the remote control unit includes:
a wireless fidelity (WiFi) module, a wireless router module, and a serial-to-WiFi module;
the WiFi module is connected to the controlled terminal and the wireless router module, the wireless router module is connected to the serial-to-WiFi module, the controlled terminal, and the control device, and the serial-to-WiFi module is connected to the FPGA in the controlled terminal; and
when the controlled terminal is powered on, the WiFi module operates in an access point (AP) mode, a wireless network centered on the WiFi module is established, and wireless network configuration information is sent to the wireless router module, such that the wireless router module connects the controlled terminal and the control device according to the received wireless network configuration information, and when the WiFi module operates in a station (STA) networking mode, the control device sends control information to the serial-to-WiFi module through the wireless router module, such that the serial-to-WiFi module pre-processes the control information, and sends the preprocessed control information to the FPGA in the controlled terminal.

Optionally, the configuration information includes: a service set identifier (SSID) and password information of the WiFi module.

Optionally, the wireless router module includes at least one of a broadband router, a core router, or a soft router.

Optionally, the control information includes: a Media Access Control (MAC) address, an ID, and user-defined information.

Optionally, the controlled terminal includes: an FPGA, a memory, and an Internet Content Adaptation Protocol (ICAP) port;
the memory is configured to store a global initialization configuration file in an ace format; and
the FPGA is connected to the memory through the ICAP port, and is configured to determine a local configuration bitstream file based on the preprocessed control information, select the local configuration bitstream file from the global initialization configuration file, and send the local configuration bitstream file to a reconfigurable area for remote local autonomous reconfiguration.

Optionally, the controlled terminal further includes: a power supply connected to the FPGA and configured to provide power for the FPGA.

Optionally, the FPGA includes: a first controller, a second controller, a third controller, and a reconfigurable area; the first controller is connected to the serial-to-WiFi module and the second controller, and the second controller is connected to the third controller; the third controller is connected to the memory through the ICAP port; and
the first controller is configured to generate a reconfiguration instruction based on the received preprocessed control information, and send the reconfiguration instruction to the second controller, such that the second controller controls, according to the reconfiguration instruction, the third controller to select the local configuration bitstream file from the memory through the ICAP port, and sends the local configuration bitstream file to the reconfigurable area for remote local autonomous reconfiguration.

Optionally, the FPGA further includes:
a local memory bus (LMB) and a block random-access memory (BRAM); and the first controller is connected to the BRAM through the LMB bus, and the first controller is configured to send the preprocessed control information to the BRAM through the LMB bus for storage.

Optionally, when receiving the control information, the serial-to-WiFi module continuously detects a time interval between two adjacent bytes; and when the time interval is greater than a specified packetization time, it indicates that one frame of data has been sent, or when the time interval is not greater than the specified packetization time, the serial-to-WiFi module continues receiving data.

Based on specific embodiments provided in the present disclosure, the present disclosure discloses the following technical effects.

The present disclosure provides a remote reconfiguration system for an IoT intelligent sensing terminal, where the system includes: a controlled terminal with a field programmable gate array (FPGA); and a remote control unit connected to the controlled terminal and a control device; where the remote control unit is configured to receive control information sent by the control device, process the control information and send the processed control information to the FPGA, such that the FPGA performs remote local autonomous reconfiguration based on the preprocessed control information. The system disclosed in the present disclosure resolves problems that a traditional IoT terminal cannot realize remote control and cannot follow functional requirements to perform local autonomous reconfiguration, and has improved versatility and expandability.

BRIEF DESCRIPTION OF THE DRAWINGS

To describe the technical solutions in the embodiments of the present disclosure as compared to the prior art more clearly, the accompanying drawings required for the embodiments are briefly described below. The accompanying drawings in the following descriptions show merely some embodiments of the present disclosure, and a person of ordinary skill in the art may still derive other accompanying drawings from these accompanying drawings without creative efforts.

Explanation of symbols: 1—controlled terminal, 11—FPGA, 111—first controller, 112—second controller, 113—third controller, 114—reconfigurable area, 115—LMB bus, 116—BRAM, 12—ICAP port, 13—memory, 2—remote control unit, 21—WiFi module, 22—wireless router module, 23—serial-to-WiFi module, and 3—control device.

DETAILED DESCRIPTION OF THE EMBODIMENTS

Technical solutions of the embodiments of the present disclosure are clearly and completely described below with reference to the accompanying drawings. The described embodiments are merely some rather than all of the embodiments of the present disclosure. All other embodiments obtained by a person of ordinary skill in the art on the basis of the embodiments of the present disclosure without creative efforts shall fall within the protection scope of the present disclosure.

An objective of the present disclosure is to provide a remote reconfiguration system for an IoT intelligent sensing terminal, so as to control local autonomous reconfiguration remotely.

To make the above and/or other objectives, features, and advantages of the present disclosure clearer and more comprehensible, the present disclosure will be further described in detail below with reference to the accompanying drawings and the specific examples.

Figure 1:
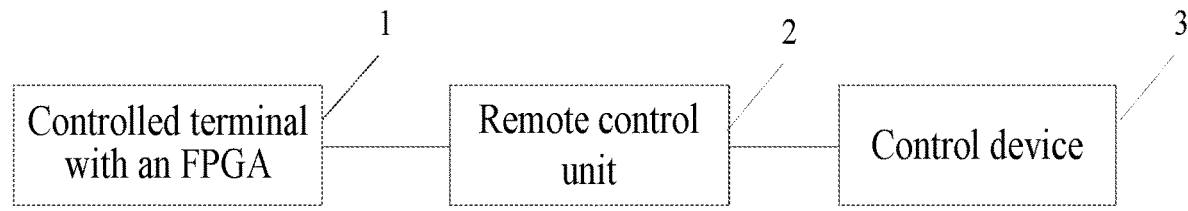
FIG. 1 is a structural block diagram of a remote reconfiguration system for an IoT intelligent sensing terminal according to the present disclosure.

As shown in FIG. 1, the present disclosure discloses a remote reconfiguration system for an IoT intelligent sensing terminal, where the system includes: a controlled terminal 1 with a field programmable gate array (FPGA) 11 (labelled in FIG. 3) and a remote control unit 2; the remote control unit 2 is connected to the controlled terminal 1 and a control device 3; and the remote control unit 2 is configured to receive control information sent by the control device 3, process the control information and send the processed control information to the FPGA 11, such that the FPGA 11 performs remote local autonomous reconfiguration based on the preprocessed control information.

Figure 2:
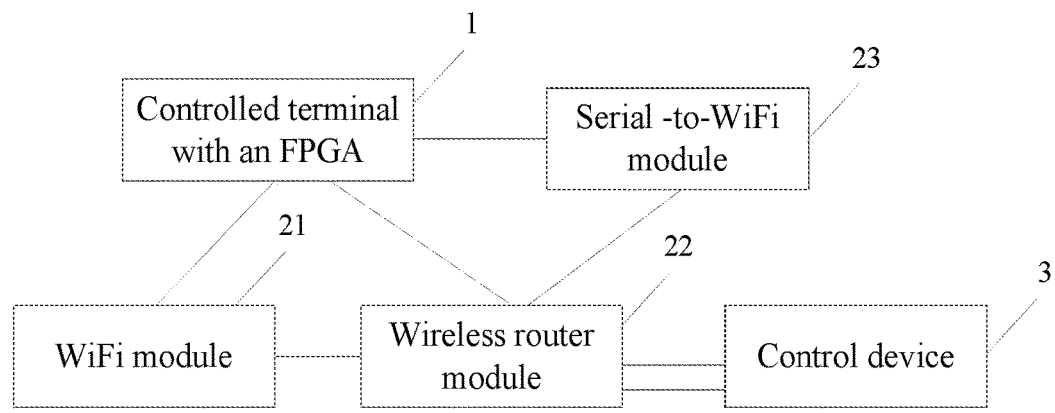
FIG. 2 is a schematic diagram of connections of structures within a remote control unit according to the present disclosure.

As shown in FIG. 2, the remote control unit 2 of the present disclosure includes a WiFi module 21, a wireless router module 22, and a serial-to-WiFi module 23. The WiFi module 21 is connected to the controlled terminal 1 and the wireless router module 22, the wireless router module 22 is connected to the serial-to-WiFi module 23, the controlled terminal 1, and the control device 3, and the serial-to-WiFi module 23 is connected to the FPGA 11 in the controlled terminal 1.

When the controlled terminal 1 is powered on, the WiFi module 21 operates in an AP mode, and a wireless network centered on the WiFi module 21 is established. Wireless network configuration information is sent to the wireless router module 22, such that the wireless router module 22 connects the controlled terminal 1 and the control device 3 according to the received wireless network configuration information. Further, when the WiFi module 21 operates in a station (STA) networking mode, the control device 3 sends control information to the serial-to-WiFi module 23 through the wireless router module 22, such that the serial-to-WiFi module 23 pre-processes the control information, and sends the preprocessed control information, to the FPGA 11 in the controlled terminal 1. The control information in this embodiment includes: a MAC address, an ID, and user-defined information. The configuration information includes: a service set identifier (SSID) and password information of the WiFi module 21.

Figure 5:
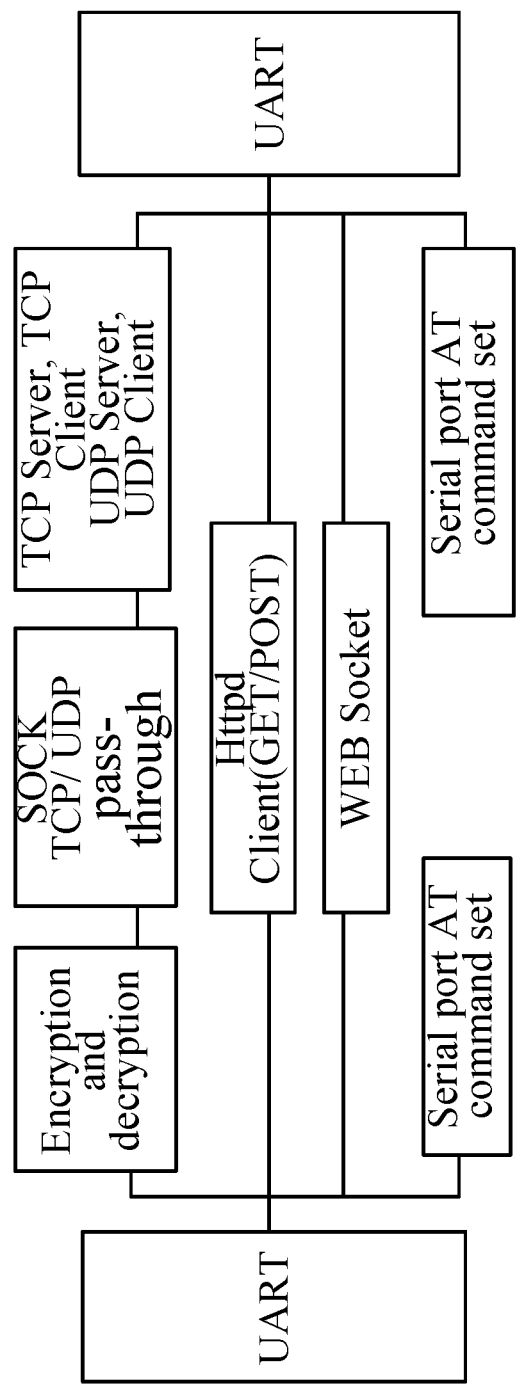
FIG. 5 is a structural schematic diagram of a serial-to-WiFi module according to the present disclosure.

As shown in FIG. 5, the serial-to-WiFi module 23 of the present disclosure adopts a universal Asynchronous Receiver/Transmitter (UART) interface-based embedded module ESP8266 with Wireless network protocol IEEE802.11 protocol stack and TCP/IP protocol stack built in. A pass-through communication mode is used to realize conversion between RS232, RS485 data to a wireless network, and complete data transmission between an UART interface and a network device. Specifically, the serial-to-WiFi module 23 operates in a SOCKET mode, and packages received control information for Socket pass-through communication. When receiving the control information, the serial-to-WiFi module 23 continuously detects a time interval between two adjacent bytes; and if the time interval is greater than a specified packetization time, it indicates that one frame of data has been sent, or if the time interval is not greater than the specified packetization time, the serial-to-WiFi module continues receiving data.

As shown in FIG. 5, a Socket connection in a pass-through mode adopts two protocols: TCP and UDP. When the UART interface is connected to an electronic interface (EI) to write data, the UART interface may automatically forward the data to the Socket. All data received through the Socket may be sent to the wireless router module 22 through the UART interface. When the Socket is set to a TCP Server state, data transmitted from the TCP may be forwarded to the UART interface one by one in the case of a plurality of TCP link connections. When the Socket is set to a UDP Server state, if a serial interface receives data first, the UART interface may forward the data to a server with an internet protocol (IP) and a port being set. Or if the UDP Server receives data first, the UART interface may record a source address for sending data, and when the serial interface receives the data, the UART interface forwards the data to this address.

In this embodiment, the wireless router module 22 includes at least one of a broadband router, a core router, or a soft router. After receiving the wireless network configuration information, the wireless router module 22 determines whether registration is successful, and if the registration is successful, the wireless router module 22 is connected to the controlled terminal 1 for remote control and data interaction.

In this embodiment, the WiFi module 21 refers to an embedded WiFi module 21, which converts the serial interface or a TTL level to conform to a communication standard of a WiFi wireless network. The WiFi module 21 operates in an AP mode during initial connection, and operates in a station (STA) networking mode for remote communication. When operating in the AP mode, the WiFi module 21 is at a central node of the network and automatically forms a wireless local area network with a clear SSID. Or when the WiFi module 21 operates in the STA networking mode, the control information is sent from the control device 3 to the controlled terminal 1 through the wireless router module 22 and the serial-to-WiFi module 23 in sequence.

Figure 3:
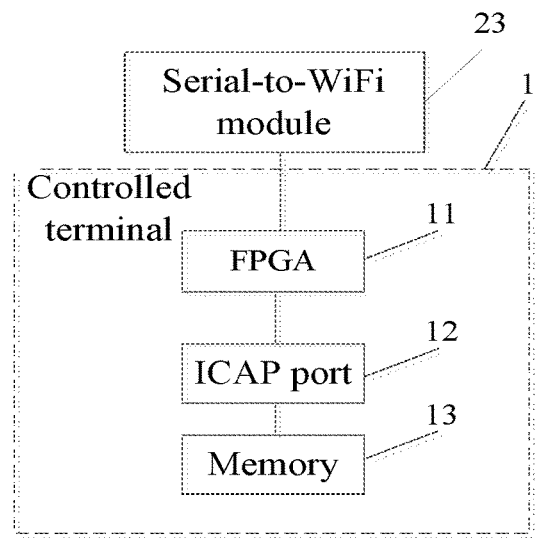
FIG. 3 is a schematic diagram of connections of structures within a controlled terminal according to the present disclosure.

As shown in FIG. 3, the controlled terminal 1 of the present disclosure includes: an FPGA 11, a memory 13, and an Internet Content Adaptation Protocol (ICAP) port 12, The FPGA 11 is connected to the memory 13 through the ICAP port 12. The memory 13 is configured to store a global initialization configuration file in an ace format. The FPGA 11 is configured to determine a local configuration bitstream file based on the preprocessed control information, select the local configuration bitstream file from the global initialization configuration file, and send the local configuration bitstream file to a reconfigurable area 114 for remote local autonomous reconfiguration.

In this embodiment, the memory 13 is a compact flash (CF) memory card. Of course, other types of memory are possible. The present disclosure performs local autonomous reconfiguration based on object linking and embedded for process control (OPC) of the FPGA 11.

As an optional implementation, the control terminal of the present disclosure further includes: a power supply connected to the FPGA 11 and configured to provide power for the FPGA 11.

As an optional implementation, the control terminal of the present disclosure further includes: an advanced extensible interface (AXI) bus, a system on chip (SOC) card, and an I/O board. The serial-to-WiFi module 23 sends the preprocessed control information to the first controller 111 in the FPGA 11, through the I/O board, the SOC card, and the AXI bus in turn. The I/O board is further used to store local autonomous reconfiguration information sent through the AXI bus and the SOC card.

As an optional implementation, the controlled terminal 1 of the present disclosure further includes: a reconfiguration I/O interface connected to the I/O board and the FPGA, and the serial-to-WiFi module 23 configures I/O interface logic as required in the reconfigurable area of the FPGA, sequentially through the I/O board and the reconfiguration I/O interface, based on the preprocessed control information.

Figure 4:
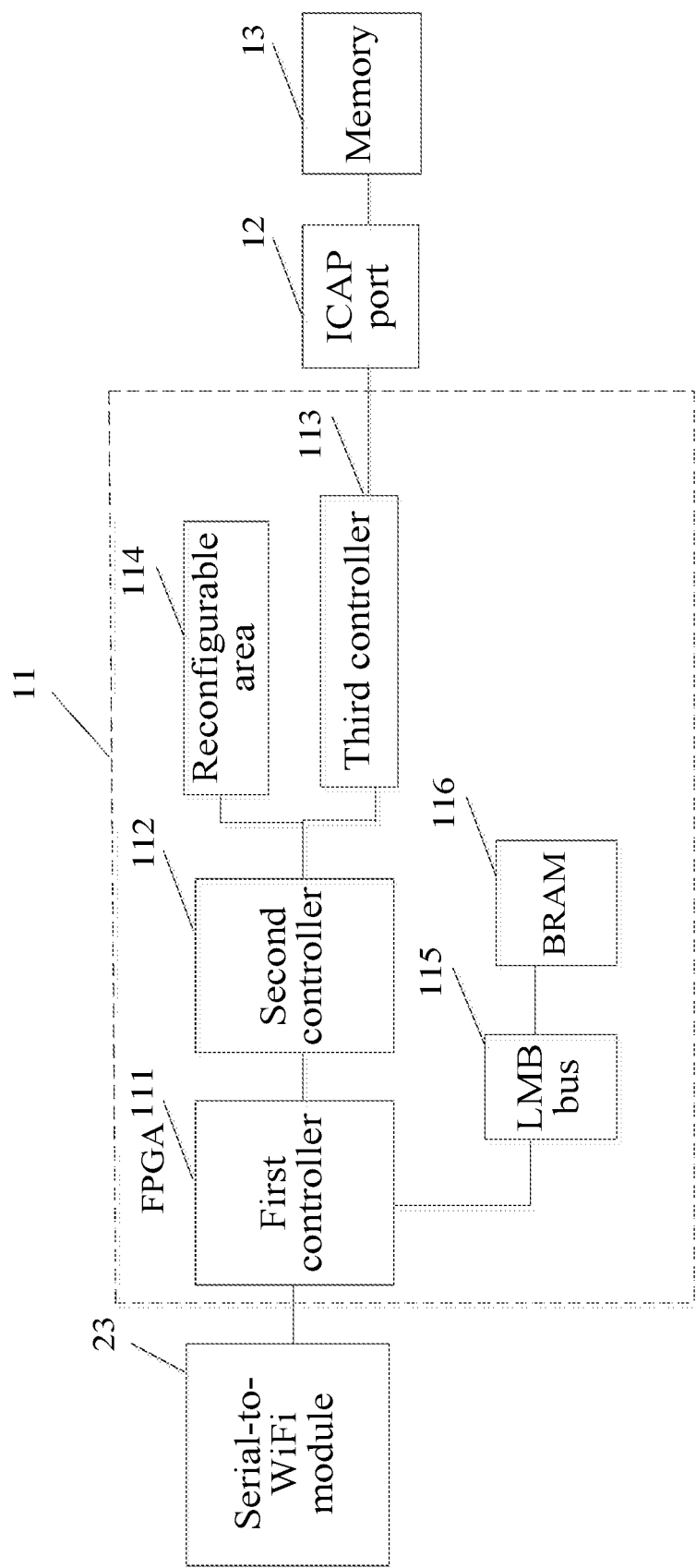
FIG. 4 is a schematic diagram of connections of structures within an FPGA according to the present disclosure.

As shown in FIG. 4, the FPGA 11 includes: a first controller 111, a second controller 112, a third controller 113, and a reconfigurable area 114. The first controller 111 is connected to the serial-to-WiFi module 23 and the second controller 112, and the second controller 112 is connected to the third controller 113; and the third controller 113 is connected to the memory 13 through the ICAP port 12.

The first controller 111 is configured to generate a reconfiguration instruction based on the received preprocessed control information, and send the reconfiguration instruction to the second controller 112, such that the second controller 112 controls, according to the reconfiguration instruction, the third controller 113 to select the local configuration bitstream file from the memory 13 through the ICAP port 12, and sends the local configuration bitstream file to the reconfigurable area 114 for remote local autonomous reconfiguration.

In this embodiment, the first controller 111 is a self-configuration controller MicroBlaze, the second controller 112 is an HWICAP controller, and the third controller 113 is a SystemACE controller. The present disclosure requires that the three controllers complete local autonomous reconfiguration under cooperation.

The FPGA 11 of the present disclosure further includes: an LMB bus 115 and a block random-access memory (BRAM) 116. The first controller 111 is connected to the BRAM 116 through the LMB bus 115, and the first controller 111 is configured to send the preprocessed control information to the BRAM 116 through the LMB bus 115 for storage.

The FPGA 11 of the present disclosure further includes a PCIe controller connected to the AXI bus, and a register in the PCIe controller is configured through the AXI bus.

Local self-reconfiguration refers to: converting the generated global initialization configuration file that merges software and hardware information from a bit format to an ace format, and then storing the ace file in a CF memory card. When a development board is powered on, the SystemACE controller reads the ace file in the CF memory card through a joint test action group (JTAG) port and initializes FPGA configuration globally. When a part of functions of the system need to be changed (namely, when the first controller 111 receives the preprocessed control information), the MicroBlaze (the first controller 111) sends a reconfiguration command to the HWICAP (the second controller 112), the SystemACE (the third controller 113) reads a local configuration bitstream file corresponding to this part of functions from an external CF memory card, and the HWICAP configures the local configuration bitstream file to a corresponding reconfigurable partition of the FPGA to complete local self-reconfiguration of the FPGA. The reconfiguration functions involved are completely implemented on an FPGA chip, and the self-reconfiguration of the FPGA may be realized without external intervention.

During the operation of the system of the present disclosure, some of the resources remain unchanged, and local hardware logic function modification is performed only on a part to be reconfigured. The entire system needs to be divided in an early stage of system design, hardware tasks that are repeatedly switched to be currently used are used as reconfigurable modules, other parts of the system are used as static modules, and an area that needs to be frequently modified is divided on a programmable logic device. For a reconfigurable system of dynamic parts, only some of the dynamic reconfigurable modules in the system are modified, and therefore, unmodified parts remain in normal operation. This may meet different functional requirements of a terminal system while reduce a reconfiguration data configuration amount, narrow a reconfiguration range, improve a configuration speed and shorten a system reconfiguration time. The local reconfigurable technology is applied to functions of the dynamic area, and a computing task function and I/O interface logic matching an access device are configured on demand, which may improve resource utilization of the FPGA.

Each example of the present specification is described in a progressive manner, each example focuses on the difference from other examples, and the same and similar parts between the examples may refer to each other.

In this specification, several specific embodiments are used for illustration of the principles and implementations of the present disclosure. The description of the foregoing embodiments is used to help illustrate the core ideas thereof. In addition, persons of ordinary skill in the art can make various modifications in terms of specific implementations and the scope of application in accordance with the ideas of the present disclosure. In conclusion, the content of this specification shall not be construed as a limitation to the present disclosure.

What is claimed is:

1. An automatic remote reconfiguration system for an Internet of Things (IoT) intelligent sensing terminal, comprising:
   a controlled terminal with a field programmable gate array (FPGA) and a memory, wherein the memory is configured to store a global initialization configuration file; and
   a remote control unit connected to the controlled terminal and a control device,
   wherein the remote control unit is configured to receive control information sent by the control device, preprocess the control information and send the preprocessed control information to the FPGA,
   the FPGA is configured to determine a local configuration bitstream file based on the preprocessed control information, select the local configuration bitstream file from the global initialization configuration file, and send the local configuration bitstream file to a reconfigurable area of the FPGA for remote local autonomous reconfiguration;
   wherein the FPGA comprises: a first controller, a second controller, a third controller, and a reconfigurable area, the first controller is connected to the serial-to-WiFi module and the second controller, and the second controller is connected to the third controller; the third controller is connected to the memory; and
   wherein the first controller, the second controller, and the third controller complete local autonomous reconfiguration under cooperation, which comprises:
   the first controller is configured to generate a reconfiguration instruction based on the received preprocessed control information, and send the reconfiguration instruction to the second controller, such that the second controller controls, according to the reconfiguration instruction, the third controller to select the local configuration bitstream file from the memory, and sends the local configuration bitstream file to the reconfigurable area for remote local autonomous reconfiguration.

2. The remote reconfiguration system according to claim 1, wherein the remote control unit comprises a WiFi module, a wireless router module, and a serial-to-WiFi module; the WiFi module is connected to the controlled terminal and the wireless router module, the wireless router module is connected to the serial-to-WiFi module, the controlled terminal, and the control device, and the serial-to-WiFi module is connected to the FPGA in the controlled terminal; and
   when the controlled terminal is powered on, the WiFi module operates in an access point (AP) mode, a wireless network centered on the WiFi module is established, and wireless network configuration information is sent to the wireless router module, such that the wireless router module connects the controlled terminal and the control device according to the received wireless network configuration information; and when the WiFi module operates in a station (STA) networking mode, the control device sends control information to the serial-to-WIFI module through the wireless router module, such that the serial-to-WiFi module pre-processes the control information, and sends the preprocessed control information to the FPGA in the controlled terminal.

3. The remote reconfiguration system according to claim 2, wherein the configuration information comprises: a service set identifier (SSID) and password information of the WiFi module.

4. The remote reconfiguration system according to claim 2, wherein the wireless router module comprises at least one of a broadband router, a core router, or a soft router.

5. The remote reconfiguration system according to claim 2, wherein the control information comprises: a Media Access Control (MAC) address, an ID, and user-defined information.

6. The remote reconfiguration system according to claim 2, wherein the controlled terminal further comprises an Internet Content Adaptation Protocol (ICAP) port;
   the global initialization configuration file is in an ace format; and
   the FPGA is connected to the memory through the ICAP port.

7. The remote reconfiguration system according to claim 2, wherein the controlled terminal further comprises: a power supply, connected to the FPGA and configured to provide power for the FPGA.

8. The remote reconfiguration system according to claim 6, wherein the second controller controls the third controller to select the local configuration bitstream file from the memory through the ICAP port.

9. The remote reconfiguration system according to claim 8, wherein the FPGA further comprises:
   a local memory bus (LMB) and a block random-access memory (BRAM); and the first controller is connected to the BRAM through the LMB bus, and the first controller is configured to send the preprocessed control information to the BRAM through the LMB bus for storage.

10. The remote reconfiguration system according to claim 2, wherein when receiving the control information, the serial-to-WIFI module continuously detects a time interval between two adjacent bytes; and when the time interval is greater than a specified packetization time, it indicates that one frame of data has been sent, or when the time interval is not greater than the specified packetization time, the serial-to-WiFi module continues receiving data.

* * * * *